C. W. ZIMMER.
SEMIFIRELESS INCUBATOR.
APPLICATION FILED DEC. 14, 1911.
1,075,747.
Patented Oct. 14, 1913.
3 SHEETS—SHEET 3.
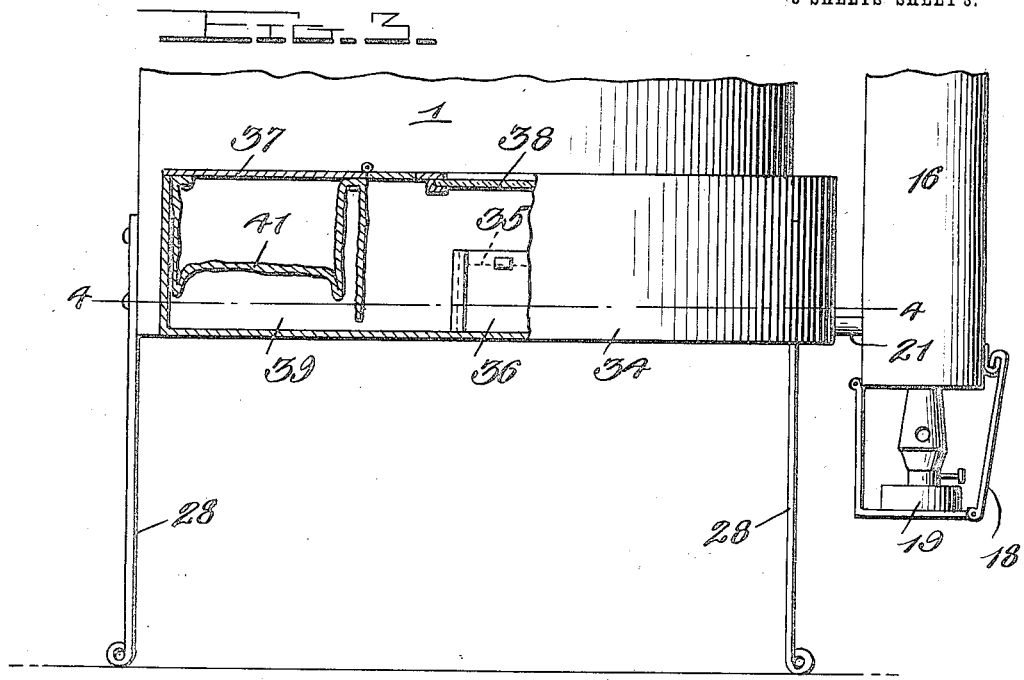
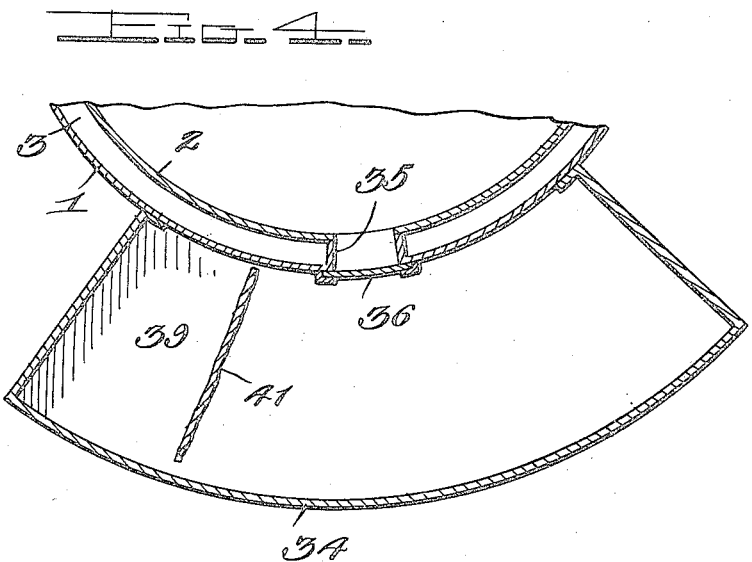
Witnesses
Chas. L. Griesbauer.
G. B. Norton.
Inventor
Cyrus W. Zimmer,
By Watson E. Coleman
Attorney

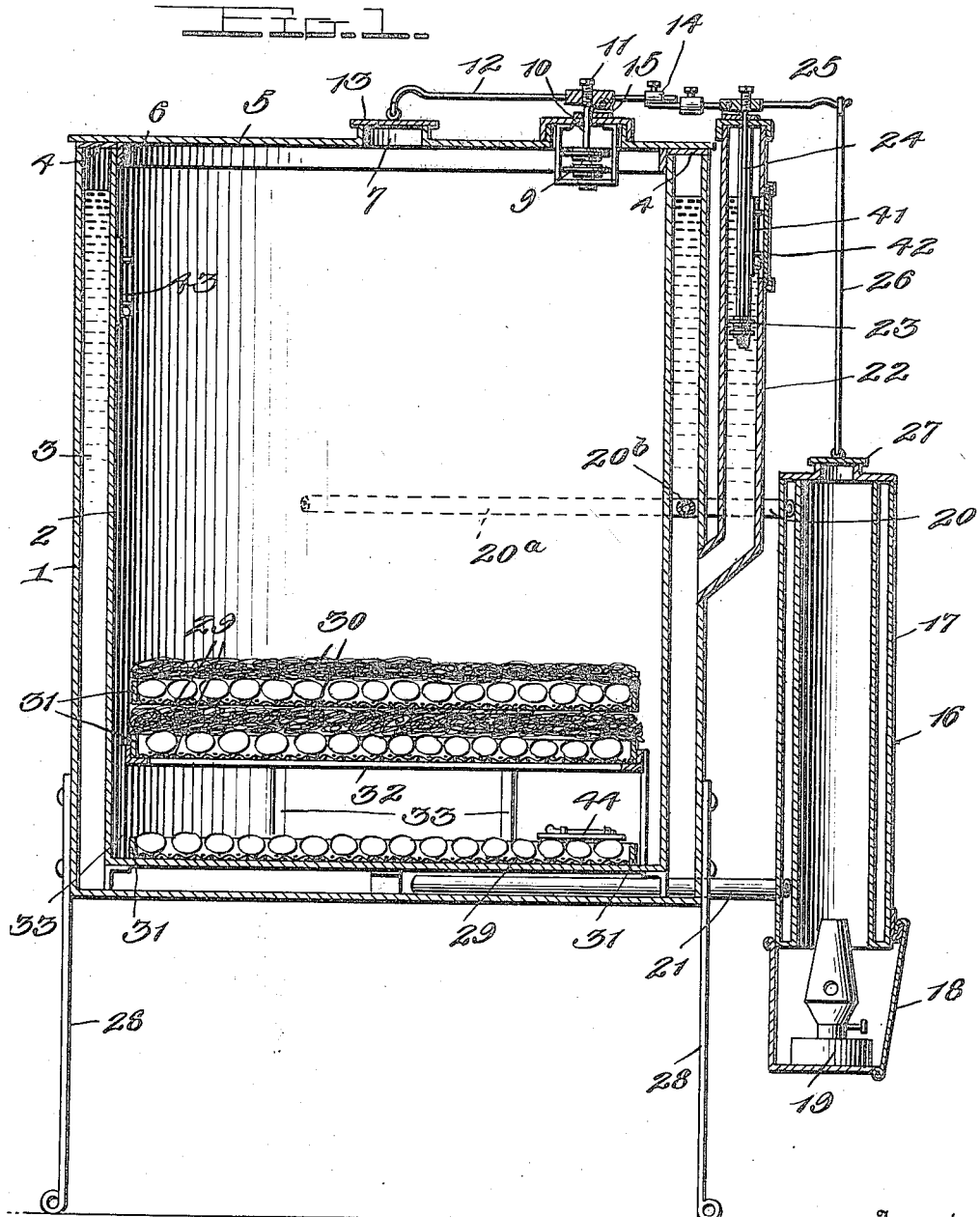

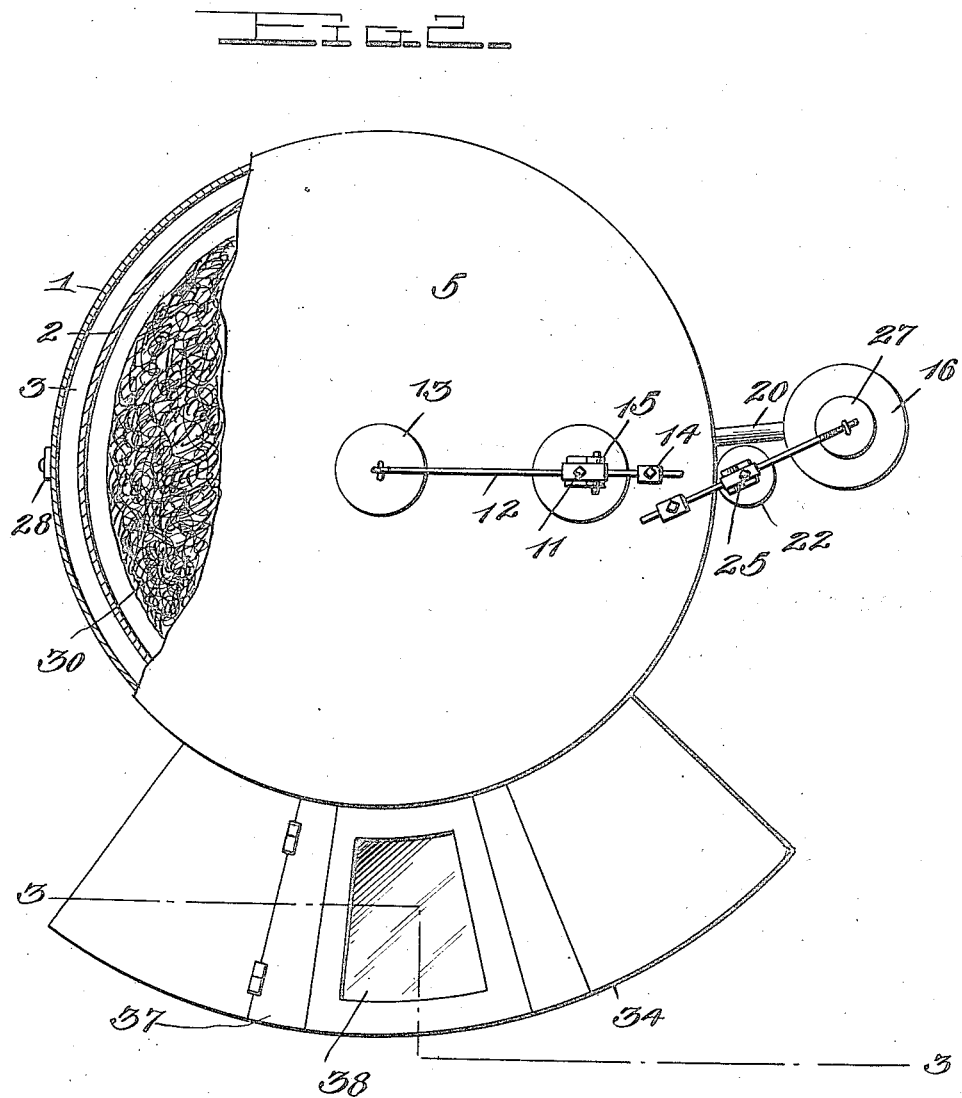

UNITED STATES PATENT OFFICE.

CYRUS W. ZIMMER, OF NEW YORK, N. Y.

SEMIFIRELESS INCUBATOR.

1,075,747. Specification of Letters Patent. Patented Oct. 14, 1913.

Application filed December 14, 1911. Serial No. 665,653.

*To all whom it may concern:*

Be it known that I, CYRUS W. ZIMMER, a citizen of the United States, residing at New York, in the county of New York and State of New York, have invented certain new and useful Improvements in Semifireless Incubators, of which the following is a specification, reference being had to the accompanying drawings.

This invention is an improved incubator which I term a semi-fireless incubator and by means of which the animal heat of the eggs which, after having been partially incubated by artificially or externally applied heat may be utilized for incubating other eggs, supplied to the incubator from time to time, one object of my invention being to effect improvements in the construction of the incubator, whereby a uniformity of heat may be maintained.

The invention further consists in the construction, combination and arrangement of devices hereinafter described and claimed.

In the accompanying drawings: Figure 1 is a vertical sectional view of an incubator constructed in accordance with my invention; Fig. 2 is a plan view of the device with parts broken away. Fig. 3 is an elevation, partly in section of my improved incubator, showing a nursery on one side thereof, the nursery being indicated in section; and Fig. 4 is a fragmentary horizontal section through the device as seen on line 4—4, Fig. 3.

The body of my improved incubator comprises an outer shell or casing 1, here shown as cylindrical in form, and an inner vessel 2 which corresponds in shape with and is somewhat smaller than the outer shell and is spaced from the sides and bottom of the latter so that a water space 3 is formed between the bottoms and also between the side walls of the outer and inner vessels. These vessels are preferably made of sheet metal, but may be made of any suitable material. The water space between the vessels is closed at the top as at 4. A removable cover 5 is provided for the inner vessel which constitutes the incubating chamber, and said cover also extends over the top 4. This cover is here shown as provided with an annular flange 6 to fit within the wall of the inner vessel and also has a centrally located ventilating opening 7. On the under side of the cover and carried thereby is a thermostatic wafer 9 which is supported by a suitable bracket or hanger. This thermostatic wafer actuates a pin 10 which operates in a small hole in the cover and is in contact with an adjusting screw 11 carried by a weighted lever 12, which lever has a damper 13 connected to its longer end and disposed over the opening 7, the weight 14 being at the shorter end of the arm of the lever, and the latter being pivotally mounted between a pair of ears 15 with which the cover is provided. At one side of the body of the incubator is a heater 16 which comprises a water jacketed flue 17, at the lower end of which is a carrier 18 for a suitable lamp 19. The water jacket of the flue 17 is connected to the water space of the body of the incubator by a flow pipe 20 and a return pipe 21. Hence, the water which is heated by the action of the lamp in the water jacket of the flue passes into the water space of the body of the incubator and the cooler water from the latter returns back, through the return pipe 21, into the water jacketed heating flue and hence a constant circulation of heated water is maintained throughout the water jacketed heating flue and the water space of the incubator and the temperature in the incubating chamber of the latter is kept substantially uniform.

That portion of the flow pipe 20 within the incubator is provided with two curved branches $20^a$, which extend partly around in the water space 3, the two branches, in practice, extending about two-thirds the circumference of the incubator. This pipe carries the water in opposite directions about two-thirds of the way around the incubator and the open ends of the branches permit the water from said pipe to flow into and mingle with the water in the water space. Openings $20^b$ are also provided in these branches to permit of the partial escape of the heated water at different points around the incubator. These openings are of such size and number and are so located as to cause the temperature of the water in the water space or chamber to be the same at all points. The water in the water chamber is in contact with the branches $20^a$ containing the heated supply water, takes up the heat thereof to some extent and assists in reducing the temperature of the supply water in the branches before it is permitted to escape therefrom and, hence, this also assists in securing an equal distribution of the heated water.

A vertical pipe 22 leads from one side of the water space of the incubator body and is filled with water therefrom, and in this pipe is placed a thermostatic wafer 23 which is similar to the wafer 8 hereinbefore described and, through the instrumentality of a pin 24, operates a weighted lever 25, the longer arm of which is connected, by a wire 26, to a damper 27 which operates at the upper end of the water jacketed flue.

The wafer 9, in connection with the damper 13 of the incubating chamber, constitutes an auxiliary regulator, located on the lid of the incubator, which serves to allow the operator to permit a certain amount of ventilation for the incubating eggs all of the time, which ventilation may be increased or decreased at will. The auxiliary regulator also prevents the chicks from being killed by being overheated, in the event that the regulator for the heating apparatus should fail to operate.

The thermostatic wafer 23, in connection with the damper 27, directly controls the draft from the lamp and, hence, also the heating efficiency of the water jacketed flue and, thereby, my improved incubator is doubly regulated as to its temperature and hence I am enabled to readily maintain the required even temperature in the incubating chamber. Moreover, the incubating chamber is automatically ventilated, as will be understood. Suitable supporting legs such as are indicated at 28 are provided for the body of the incubator to support the same at the desired distance above the floor.

In practice, my incubator is preferably made of such size as to provide a capacity for a thousand eggs, the inner diameter of the inner vessel 2, which constitutes the incubating chamber, being twenty-two inches and the height thereof twenty-eight inches. The incubator may, however, be made of any size desired.

A series of removable egg trays 29 is also provided and a series of mats 30 which are preferably feather mats. The trays are made of wire mesh and each is provided with a metal rim 31. The diameter of the trays is less than that of the incubating chamber. In practice, where the incubating chamber is twenty-four inches in diameter I make the trays twenty-two inches in diameter so that when the trays are placed in the center of the incubating chamber there is an air space of one inch around them for ventilation.

In practice I employ a thermometer 41, in the pipe 22, suspended therein and submerged in the water. The pipe has a glazed opening 42 in one side, through which the said thermometer may be inspected. I also, when the incubator is in operation, use thermometers 43, suspended in the incubating chamber at different heights in the space around the layers of eggs, and I may also place a thermometer 44 in each egg tray, with the eggs under the feather mats, hence enabling the operator to know the temperature of the water which heats the incubator, the temperature of the air in the incubating chamber surrounding the eggs, as well as the temperature of the eggs in each and every tray.

In the operation of my incubator, and by my improved method of hatching, I introduce a layer of eggs, progressively from day to day. On the first day a layer of eggs is placed directly in the bottom of the incubating chamber, after the incubator has been artificially heated and while the heating apparatus is in operation, and a feather mat is placed on said layer. On the second day another layer is placed in the bottom of the incubating chamber, the first layer being placed in one of the trays and disposed on the new layer, and separated therefrom by a feather mat and also covered by another feather mat. I continue this process from day to day, supplying a new layer each day at the bottom of the incubating chamber and raising the other layers, so that the layers are disposed in the order of their ages, with the oldest eggs on top. I continue this for ten consecutive days. During this period the incubator is artificially heated and is kept at the usual incubating temperature, and I continue this artificial heating for two days longer, or until the twelfth day is reached and the upper layer of eggs is twelve days old in point of incubation. By this time incubation has so far progressed in the eggs of the upper layer that there is circulation of blood in the embryos of that layer and the said layer gives off considerable animal heat. At this point in the period of incubation the lamp is extinguished and the incubator allowed to cool gradually, and when it has become partially cooled all the trays containing the eggs are taken out of the incubator and a mat of feathers is placed on the bottom of the incubating chamber. The eggs are now replaced in the incubating chamber in reverse order to the former arrangement, that is to say, the oldest eggs in point of incubation are placed in first, at the bottom of the superimposed trays or layers of eggs, the newest eggs being on top. Hence, the eggs in which incubation has progressed so far as to cause them to give out animal heat are below the other eggs and this animal heat is utilized to maintain the required temperature in the incubating chamber and to continue the hatching of all of the eggs. The artificial heating may be wholly or partially discontinued or may be progressively reduced from day to day, according to the conditions.

It will be understood that each layer of eggs supports the weight of the eggs in the upper layers and that the eggs in the bottom layer in which the process of incubation is the most advanced, support the weight of all the other eggs. The heat of the hatching eggs causes them to expand and apply pressure to the shells, thus tending to disintegrate the shells, and this disintegrating process is greatly promoted and facilitated by the weight of the superincumbent layers of eggs, the weight tending to flatten the lower eggs, change the shape of their shells and, hence, aiding in their decomposition and rendering them somewhat more brittle. This enables the chicks, when the hatching is complete, to be liberated more easily.

When the day arrives for the hatching of the lowest layer of eggs, said layer is relieved of the weight of the other layers. To effect this, the other layers are removed, a support is placed in the bottom of the incubator, and the layers of eggs are then replaced in the same order as before.

A suitable support is shown in Fig. 1 and comprises a circular form 32 having a series, say about six, of supporting legs 33. The height of this support is such that it forms a space of about an inch above the bottom layer and below the next lowest layer, thereby providing room for the chickens to hatch at the bottom of the incubator.

I also provide a nursery 34 for the newly hatched chickens. This nursery is on one side of the incubator, directly in contact therewith and is reached by the chicks through an opening 35 with which the incubator is provided, there being a slide 36 to cover this opening when desired. The nursery has a lid 37 provided with a glazed opening 38 which admits light thereto. The chicks after hatching and becoming strong enough to run around, see and are attracted by this light, which also shines through the opening 35, and go into the nursery chamber, where gravel would be placed on the floor. At one end of the nursery is a hover chamber 39, curtained off, as at 40, and provided with a hover blanket 41, suspended from the top, under which the chicks can cuddle for warmth, a considerable degree of heat being supplied by the warm air which comes in from the incubating chamber. The lid of the nursery may be a sliding one, capable of being opened either partially or entirely, as desired.

The feather mats which I employ in my incubator to cover the layers of eggs serve to retain heat and also to ventilate the eggs and closely approach natural conditions. By making the egg trays of less diameter than the incubator chamber in which they are placed the eggs in the incubator chamber are kept surrounded on all sides by the air in the incubator chamber and, hence, they are effectually ventilated.

The construction of my improved fireless incubator is such that the operator has a wide control over the necessary conditions for successful incubation, in that he can vary the number of cover mats over the eggs in the incubating chamber as may be required to retain the necessary heat and moisture in the incubating chamber under varying conditions, as to locality, altitude, heat and cold, and the season of the year.

Having thus described my invention I claim:

An incubator comprising an outer casing, an inner casing spaced from the latter to provide a water space between the sides and bottoms of the same, a vertical pipe disposed outside of the outer casing and having the lower end thereof communicating with said water space intermediate the upper and lower ends thereof, said pipe extending to a point above the top of the outer casing and adapted to contain water to the same height as that in the water space, means to heat and maintain circulation in said water space including a heater, and a flue in connection therewith disposed beyond the outer casing, a damper for said flue, a thermostatic wafer disposed in said pipe from the top thereof to be partially immersed in the water therein, means in connection with the upper end of said wafer and said damper for thermostatically regulating the latter, whereby to regulate the heating of the water in the water space, a removable top applied to the upper ends of said casings, said top being provided with a damper, and additional means carried by said top and actuated by the heat units in the inner casing for thermostatically regulating the last mentioned damper.

In testimony whereof I hereunto affix my signature in the presence of two witnesses.

CYRUS W. ZIMMER.

Witnesses:
 HERBERT D. COHEN,
 JEREMIAH O. CROWLEY.